(12) United States Patent
Iwashita et al.

(10) Patent No.: US 8,939,267 B2
(45) Date of Patent: Jan. 27, 2015

(54) TORQUE CONVERTER

(75) Inventors: Norio Iwashita, Hiroshima (JP);
Tokimori Saka, Hiroshima (JP);
Takashi Ishiyama, Higashihiroshima (JP); Hidetoshi Maeta, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/821,946

(22) PCT Filed: Jul. 21, 2011

(86) PCT No.: PCT/JP2011/004118
§ 371 (c)(1),
(2), (4) Date: Mar. 8, 2013

(87) PCT Pub. No.: WO2012/042718
PCT Pub. Date: Apr. 5, 2012

(65) Prior Publication Data
US 2013/0175131 A1    Jul. 11, 2013

(30) Foreign Application Priority Data

Sep. 29, 2010   (JP) .................. 2010-218590

(51) Int. Cl.
*F16H 45/02*   (2006.01)
*F16D 33/18*   (2006.01)
*F16H 41/30*   (2006.01)

(52) U.S. Cl.
CPC ............... *F16D 33/18* (2013.01); *F16H 41/30* (2013.01); *F16H 45/02* (2013.01); *F16H 2045/021* (2013.01); *F16H 2045/0284* (2013.01)

USPC ................ 192/3.3; 192/85.61; 192/113.34

(58) Field of Classification Search
CPC ................ F16H 2045/02; F16H 2045/0215
USPC .................................... 192/3.29, 3.3
See application file for complete search history.

(56) References Cited

U.S. PATENT DOCUMENTS 5,575,363 A * 11/1996 Dehrmann et al. ............ 192/3.3
5,769,196 A    6/1998 Murata
(Continued)

FOREIGN PATENT DOCUMENTS

JP   02-173458 A   7/1990
JP   09-060707 A   3/1997
(Continued)

OTHER PUBLICATIONS

International Search Report; PCT/JP2011/004118; Oct. 25, 2011.

*Primary Examiner* — Richard M. Lorence
(74) *Attorney, Agent, or Firm* — Studebaker & Brackett PC (57) ABSTRACT

A torque converter includes, in a case coupled to an output shaft of an engine, a torus formed from a pump, a turbine and a stator having a one-way clutch on the inside thereof, and a lock-up clutch. In addition, in this torque converter, a fluid from a pump is introduced from a space between a stator shaft (F2) and a turbine shaft (F1), and discharged from a space between a pump sleeve (23) and the stator shaft (F2) through a space where the lock-up clutch is disposed and the torus. Moreover, this torque converter further includes a seal member (80) which is disposed at a side that is closer to the engine than a spline engagement part (P2) of an inner race (52) and the stator shaft (F2), and seals a space between an inner peripheral face of the inner race (52) and an outer peripheral face of the stator shaft (F2).

6 Claims, 5 Drawing Sheets (56) References Cited

U.S. PATENT DOCUMENTS

2004/0251104 A1\* 12/2004 Abe et al. .................. 192/3.29
2008/0173512 A1 7/2008 Kaneko et al.
2008/0257675 A1\* 10/2008 Sasse et al. ................ 192/3.29
2013/0056319 A1\* 3/2013 Lindemann et al. ........ 192/3.29

FOREIGN PATENT DOCUMENTS

| | | |
|---|---|---|
| JP | 2003-206770 A | 7/2003 |
| JP | 2007-333074 A | 12/2007 |
| JP | 2008-175338 A | 7/2008 |

\* cited by examiner

TORQUE CONVERTER

TECHNICAL FIELD

The present invention relates to a torque converter of an automatic transmission that is mounted on a vehicle, and in particular relates to a torque converter provided with a lock-up clutch.

DESCRIPTION OF BACKGROUND ART

A torque converter that is mounted on an automatic transmission and transmits the engine output to the transmission includes, in a case coupled to an output shaft of the engine, a pump which rotates integrally with the case, a turbine disposed opposite to the pump and which is driven by the pump via a fluid, and a stator disposed on the inner side of a part between the pump and the turbine that are opposite to each other.

The stator is supported by a transmission case via a one-way clutch disposed on an inner side of the stator, and increases the torque by being fixed at an area where the velocity ratio is small; that is, area where the ratio of the turbine speed relative to the pump speed is small, and receiving the reactive force of the fluid that flows backward from the turbine to the pump.

A turbine shaft coupled to the turbine and extending toward the transmission is disposed on the center line of the torque converter. A stator shaft extending from the transmission case and fitted with the inner race of the one-way clutch is disposed on the outside of the turbine shaft. And further, a pump sleeve extending from the case of the torque converter toward the transmission to drive the oil pump serving as a fluid supply source is disposed on the outside of the stator shaft.

Moreover, a torque converter is sometimes provided with a lock-up clutch which directly couples the pump and the turbine in order to improve the fuel economy of the engine during the driving state excluding cases of starting the vehicle and the like in which the torque increasing effect by the stator is utilized, or of a gear-change which requires to allow the relative rotation of the pump and the turbine. As this lock-up clutch, a multiple-disc lock-up clutch including a piston which locks a plurality of friction plates when a predetermined working pressure is supplied to these friction plates and a hydraulic chamber.

With a torque converter including this kind of lock-up clutch, a fluid is introduced from the oil pump to the space between the stator shaft and the turbine shaft. The fluid is supplied to a torus configured from the pump, the turbine and the stator, and additionally supplied to the space where the lock-up clutch is disposed, and thereby fills the torque converter.

In addition to transmitting the torque in the torus, this fluid also functions to cool the heat that arises during the slip control of the lock-up clutch. The fluid that is heated as a result of transmitting the torque and cooling the lock-up clutch in the torque converter is discharged from the space between the pump sleeve and the stator shaft.

Nevertheless, there is a possibility that a part of the fluid that was introduced from the space between the stator shaft and the turbine shaft will leak from the space between the pump sleeve and the stator shaft through the spline engagement part of the inner race and the stator shaft of the one-way clutch without circulating through the torus and the space where the lock-up clutch is disposed, and it will not be possible to sufficiently cool the lock-up clutch.

Figure 6:
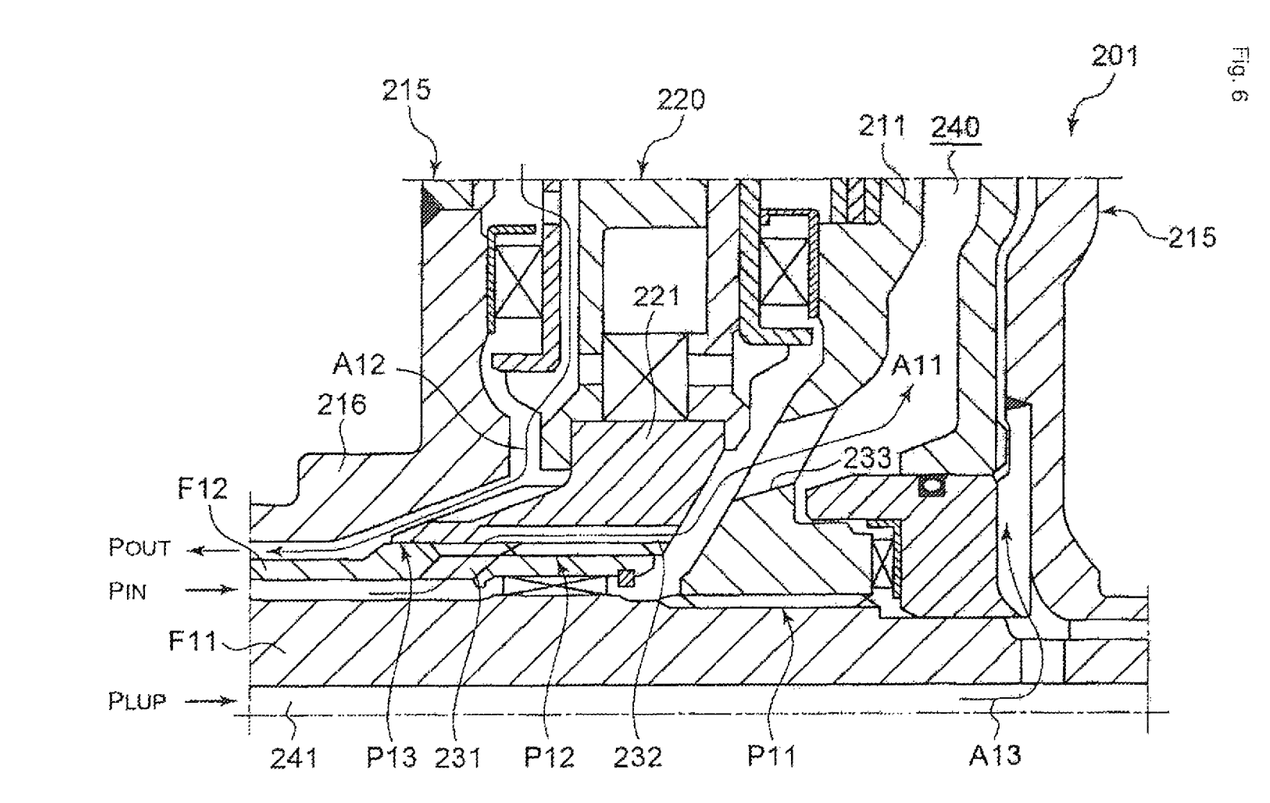
FIG. 6 is an explanatory diagram explaining a conventional torque converter.

Meanwhile, for example, the type disclosed in Japanese Patent Application Publication No. 2008-175338 is known to improve the cooling performance of the lock-up clutch. As shown in FIG. 6, in this torque converter 201, the turbine is coupled to the turbine shaft F11 of the automatic transmission at the position shown as P11. Specifically, the turbine hub 211 coupled to the turbine is coupled to the turbine shaft F11 via spline engagement.

Moreover, in this torque converter 201, the inner race 221 of the one-way clutch 220 is spline-engaged with the stator shaft F12 at the position shown as P12, and fitted tightly (that is, tightly engaged) with the stator shaft F12 at the position shown as P13 that is more on the non-engine side (that is, the side that is farther from the engine relative to the spline engagement part P12) than the spline engagement part P12 with the stator shaft F12.

In addition, in the torque converter 201, the fluid that is introduced from the space between the stator shaft F12 and the turbine shaft F11 is supplied to the space 240 where the lock-up clutch is disposed by passing through, as shown with the arrow A11, the fluid passage 231 provided to the stator shaft F12, the fluid passage 232 provided to the inner race 221, and the fluid passage 233 provided to the turbine hub 211, supplied from the space 240 to the torus configured from the pump, the turbine and the stator, and, as shown with the arrow A12, discharged from the torus to the space between the pump sleeve 216, which is coupled to the case 215, and the stator shaft F12.

Thus, this torque converter 201 improves the cooling performance of the lock-up clutch by spline-engaging and tightly fitting the inner race 221 and the stator shaft F12 and supplying the fluid, which was supplied from the space between the stator shaft F12 and the turbine shaft F11, to the space 240 where the lock-up clutch is disposed. Note that, with this torque converter 201, the fluid which controls the operation of the lock-up clutch is supplied through the fluid passage 241 extending in the axial direction of the turbine shaft F11 as shown with the arrow A13 separately from the fluid passages shown with the arrows A11 and A12.

Nevertheless, even in cases of inhibiting the leakage of the fluid to the space between the pump sleeve and the stator shaft through the space between the inner race and the stator shaft by providing a tightly fitted part (that is, a portion that is tightly engaged) on the non-engine side of the spline engagement part of the inner race and the stator shaft as described in foregoing Japanese Patent Application Publication No. 2008-175338, in actually, when considering the assemblability of the inner race housed in the torque converter and the stator shaft extending from the transmission case, it is necessary to provide a clearance between the inner race and the stator shaft at the tightly fitted part.

If a clearance is provided between the inner race and the stator shaft at the tightly fitted part, as described above, the fluid will leak to the space between the pump sleeve and the stator shaft through the space between the inner race and the stator shaft, and the lock-up clutch cannot be sufficiently cooled.

SUMMARY OF INVENTION

The present invention was devised in view of the foregoing technical problems, and its object is to provide a torque converter capable of improving the cooling performance of the lock-up clutch while ensuring favorable assemblability of the torque converter and the stator shaft.

Thus, the torque converter of the present invention includes a case coupled to an output shaft of an engine, a pump which rotates integrally with the case, a turbine disposed opposite to an engine side of the pump, a stator which is disposed on the inside of a part between the pump and the turbine that are opposite to each other and which has a one-way clutch on the inside thereof, a torus formed by the pump, the turbine and the stator within the case, a lock-up clutch which is disposed at a side that is closer to the engine than the turbine and which directly couples the turbine and the case, a turbine shaft coupled to the turbine and extending toward a transmission, a stator shaft which is disposed on the outside of the turbine shaft and which extends from a transmission case of an automatic transmission and which is spline-engaged with an inner race of the one-way clutch, a pump sleeve disposed on the outside of the stator shaft and extending from the case toward the transmission to drive an oil pump, a fluid passage formed so that a fluid from the oil pump is introduced from a space between the stator shaft and the turbine shaft, and discharged from a space between the pump sleeve and the stator shaft through a space which is located between the turbine and the case and in which the lock-up clutch is disposed, and through the torus, and a seal member which is disposed at a side that is closer to the engine than of a spline engagement part of the inner race and the stator shaft, and seals a space between an inner peripheral face of the inner race and an outer peripheral face of the stator shaft.

DESCRIPTION OF THE PREFERRED EMBODIMENTS

Embodiments of the present invention are now explained with reference to the appended drawings.

Figure 1:
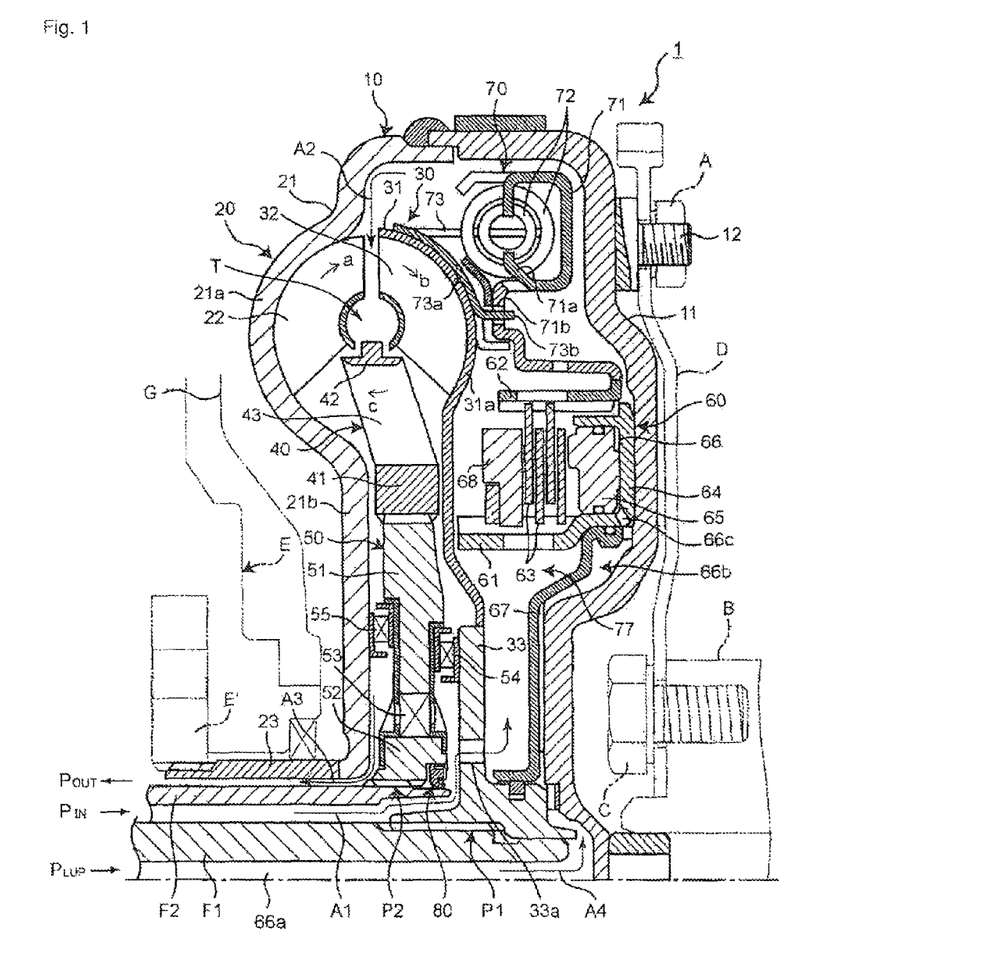
FIG. 1 is a cross sectional view of the torque converter according to the first embodiment of the present invention.
Figure 2:
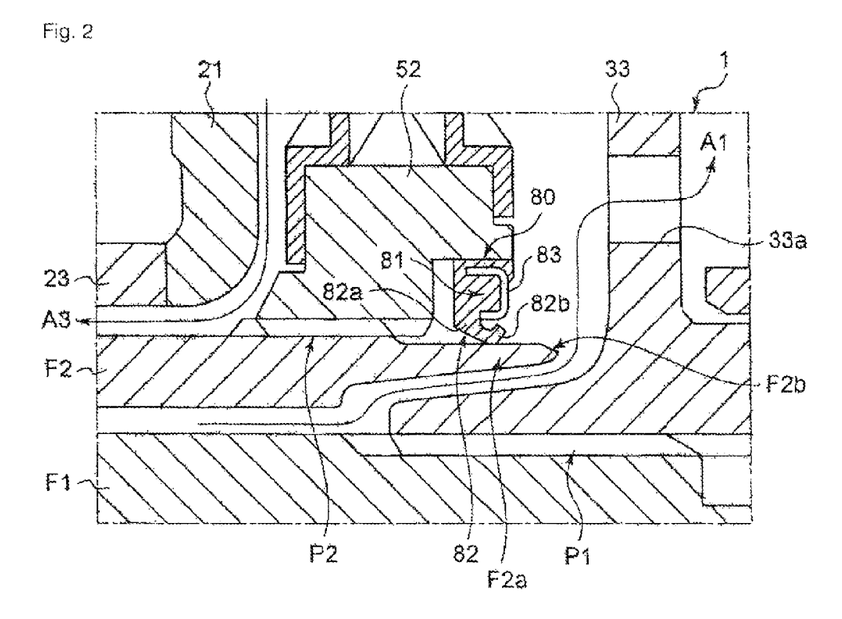
FIG. 2 is an enlarged view showing the main part of FIG. 1.

FIG. 1 is a cross section of the torque converter according to the first embodiment of the present invention, and FIG. 2 is an enlarged view showing the main part of FIG. 1. As shown in FIG. 1, the torque converter 1 has a case 10 which forms its outer shell, and the case 10 is mounted on the outer periphery of a drive plate D, which is mounted on an end of a crank shaft B of an engine using a crank bolt C, with a plurality of stud bolts 12 fixed to the outer periphery of a front cover 11 configuring the face of its engine side and a nut A that is screwed with the foregoing bolts 12. Consequently, the entire torque converter 1 is coupled to the crank shaft B and driven by the engine. Note that, in the ensuing explanation, for the sake of convenience, the engine side (that is, the side that is closer to the engine which corresponds to the right side in the drawings) shall be the front side, and the non-engine side (that is, the side that is farther from the engine and which corresponds to the left side in the drawings) shall be the rear side.

The torque converter 1 includes, as its main components, a pump 20, a turbine 30, a stator 40, a one-way clutch 50, and a lock-up clutch 60, and these are housed in the case 10. In addition, oil as the fluid is filled in the case 10.

The pump 20 is configured from a pump shell 21 configuring the face on the non-engine side of the case 10, and a plurality of blades 22 disposed at predetermined gaps in the circumferential direction inside a curved part 21a provided to the outer periphery of the shell 21 and which bulges rearward. In addition, the pump 20 rotates integrally with the case 10 to guide the oil filled in the case 10 by using the blade 22 and the inner surface of the curved part 21a, and generates a flow a in the oil of heading from the rear to the front while whirling around the axis.

Moreover, in the pump 20, specifically, the pump sleeve 23 extending toward the transmission is coupled to the inner peripheral end of the pump shell 21. And the tip of the pump sleeve 23 is engaged with an inner gear E of a gear-type oil pump E disposed behind the torque converter 1. Thereby, the oil pump E is driven via the case 10 and the pump sleeve 23 based on the rotation of the crank shaft B.

The turbine 30 is configured from a turbine shell 31 having a curbed part 21a of the pump shell 21 at the outer periphery and a curved part 31a which is curved to the opposite side, a plurality of blades 32 disposed at predetermined gaps in the peripheral direction inside the curved part 31a of the shell 31, and a turbine hub 33 coupled to the inner peripheral end of the shell 31, and is housed in the case 10 in a freely rotatable manner by being disposed opposite to the front of the pump 20.

In addition, the curved part 31a where the blades 32 of the turbine shell 31 are disposed and the curved part 21a where the blades 22 of the pump shell 21 are disposed are disposed to face each other. Thereby, the flow a generated by the rotation of the pump 20 is introduced into the curved part 31a of the turbine shell 31, and a flow b which directs inward is formed by the inner surface of the curved part 31a and the blades 32. This flow b presses the blades 32, so that the turbine 30 is subject to force in the circumferential direction, and is thereby driven in the same direction as the pump 20. Moreover, this driving force is transmitted to the transmission by the turbine shaft F1 extending toward the transmission of the automatic transmission coupled to the turbine 30 at the position shown as P1. Note that the turbine 30 is coupled to the turbine shaft F1 by means of the inner peripheral end of the turbine hub 33 is spline-engaged with the turbine shaft F1.

The stator 40 is disposed on the inner side of the part between the pump 20 and the turbine 30 that are opposite to each other, and is configured by providing a plurality of blades 43 extending radially between the inner ring part 41 and the outer ring part 42 at predetermined gaps in the circumferential direction, and integrating them as a whole. As a result of the blade 43 being disposed so that it is positioned between the end on the inner peripheral side of the blades 22 in the pump 20 and the end on the inner peripheral side of the blades 32 in the turbine 30, the flow b of the fluid that drove the turbine 30 is introduced from the turbine 30 side, and a flow c that passes through a space between the respective blades 43 is formed.

In addition, as a result of this flow c being introduced from the inner peripheral side to the curved part 21a of the pump shell 21 and becoming the flow a, a flow that passes through and circulates among the pump 20, the turbine 30 and the respective blades 22, 32, 43 of the stator 40 is formed. As the overall torque converter 1, a donut-shaped space; that is, a torus T formed with the foregoing circulatory path is formed.

The one-way clutch 50 supports the stator 40 and realizes the torque increasing effect by the stator 40, and is disposed on the inner side of the stator 40. This one-way clutch 50 includes an outer race 51, an inner race 52, and a plurality of sprags 53 interposed between the foregoing races 51, 52, the inner peripheral face of the inner ring part 41 of the stator 40 is spline-engaged to the outer peripheral face of the outer race 51 based on press fitting, and the inner race 52 is assembled to the stator shaft F2 by the inner peripheral face being spline-engaged to the stator shaft F2 extending from the transmission case G of the automatic transmission.

Note that the position of the outer race 51 in the axial direction is restricted by the thrust bearings 54, 55 respectively disposed between the outer race 51 and the turbine hub 33 positioned in the front thereof, and between the outer race 51 and the inner peripheral part of the pump shell 21 positioned in the rear thereof. Consequently, the positioning of the stator 40 in the axial direction relative to the pump 20 and the turbine 30 is thereby set.

In addition, when the stator 40 receives rotating force in one direction as a result of the pressing force working on one face of the blades 43 based on the flow c, it rotates freely as a result of the one-way clutch 50 running idle. Moreover, when the stator 40 receives rotating force in another direction as a result of the pressing force working on the other face of the blades 43, the one-way clutch 50 is fixed by being locked. Here, the torque increasing effect is yielded, and the torque input from the engine to the pump 20 is increased, and output from the turbine 30 to the turbine shaft F1.

In the torque converter 1 according to this embodiment, as shown in FIG. 2, the inner race 52 of the one-way clutch 50 is formed such that its inner peripheral face has a greater inner diameter on the engine side than that spline engagement part P2 between the stator shaft F2 and the inner race 52, and a cylindrical extended part F2a extending more toward the engine side than the spline engagement part P2 between the inner race 52 and the stator shaft F2 is formed at the tip part of the stator shaft F2.

In addition, a ring-shaped seal member 80 is mounted, via press fitting, between the inner peripheral face of the inner race 52 and the outer peripheral face of the stator shaft F2; specifically, the outer peripheral face of the extended part F2a on the side that is closer to the engine than the spline engagement part P2 of the inner race 52 and the stator shaft F2.

The seal member 80 is used for sealing the space between the inner peripheral face of the inner race 52 and the outer peripheral face of the stator shaft F2, and is formed to have an approximately rectangular cross section. The seal member 80 includes a main body part 81 which comes in contact with the inner peripheral face of the inner race 52, and a lip part 82 extending from the main body part 81 toward the inner side and which comes in contact with the outer peripheral face of the stator shaft F2.

The lip part 82 is provided so that it is inclined forward as it heads from its base end part 82a toward its tip part 82b and is positioned on a front-cover-11-side, and is provided in a direction to prevent the leakage of the fluid from the engine side to the non-engine side. Note that the seal member 80 is formed using an elastic material such as rubber, and a cored bar 83 is integrally formed to the main body part 81.

In this embodiment, the seal member 80 which seals the space between the inner peripheral face of the inner race 52 and the outer peripheral face of the stator shaft F2 is disposed so as to overlap with the one-way clutch 50 in the axial direction as shown in FIG. 2 at a side that is closer to the front cover 11 than the part P2 where the inner race 52 and the stator shaft F2 are spline-engaged.

Accordingly, as a result of the seal member 80 being disposed so as to overlap with the one-way clutch 50 in the axial direction, the axial direction dimension of the torque converter 1 can be shortened in comparison to the case where the seal member 80 and the one-way clutch 50 do not overlap with each other in the axial direction, and the torque converter 1 can be configured to be compact in the axial direction.

Moreover, the stator shaft F2 that is assembled with the inner race 52 is formed such that the outer peripheral face of its tip part is tapered, and the tip part is provided with a guide part F2b that is used for guiding the tip part into the seal member 80 upon assembling the torque converter 1 to the stator shaft F2. Specifically, the guide part F2b is provided to the tip part of the extended part F2a of the stator shaft F2.

The lock-up clutch 60 includes a clutch hub 61 and a clutch drum 62 disposed concentrically to each other, a plurality of friction plates 63 disposed between the hub 61 and the drum 62 and which are mutually engaged thereto, and a piston 65 housed slidably in a piston cylinder 64 that is provided integrally with the clutch hub 61. The clutch hub 61 and the piston cylinder 64 are fixed to the inner face of the front cover 11 via welding.

In addition, the rear part of the piston 65 in the piston cylinder 64 is used as a hydraulic chamber 66. When oil of a predetermined working pressure is introduced into the hydraulic chamber 66 from the oil passage 66a provided to the turbine shaft F1 through the oil passage 66b provided between the front cover 11 and the plate member 67 fixed to the inner face thereof, the oil passage 66c provided to the piston cylinder 64 and other passages, the plurality of friction plates 63 are pressed toward the retainer 68 by the piston 65, and the lock-up clutch 60 is thereby locked. Note that a plurality of groove parts (not shown) extending from the inward side to the outward side thereof are formed on the plurality of friction plates 63, and the oil will flow to the groove parts even when the lock-up clutch 60 is locked.

Moreover, in the torque converter 1, the lock-up clutch 60 includes a lock-up damper 70, and the lock-up damper 70 includes a spring retention plate 71, a plurality of damper springs 72 which are received by a spring receiving part 71a disposed toward the circumferential direction on a predetermined circumference of the spring retention plate 71 and in which one end thereof is provided to the spring retention plate 71, and a spring receiving member 73 fixed to the outer face of the outer periphery of the turbine shell 31 and which protrudes forward, and which receives the other end of the damper springs 72.

In addition, the inner peripheral part of the spring retention plate 71 is coupled to the clutch drum 62 of the lock-up clutch 60. When the lock-up clutch 60 is locked, the rotation of the front cover 11; that is, the rotation of the crank shaft B is input to the spring retention plate 71 of the lock-up damper 70 via the lock-up clutch 60, and is transmitted from the spring receiving member 73 to the turbine 30 while compressing the damper springs 72.

Note that the spring receiving member 73 is provided with a stopper part 73b which protrudes forward from the inner peripheral end of the base part 73a fixed to the turbine shell 31, and the stopper part 73b is inserted into a slotted hole 71b provided to the spring retention plate 71 and which is long in the circumferential direction. Thereby, the relative rotation of the spring receiving member 73 and the spring retention plate 71 is restricted by a predetermined amount, and the excessive compression of the damper springs 72 is thereby inhibited.

Here, to explain the operation of the torque converter 1, at first, when the lock-up clutch 60 is not locked such as during the start of the vehicle or gear-change, the turbine 30 is driven via the oil circulating in the torus T based on the pump 20 that rotates integrally with the crank shaft B of the engine, and the driving force is transmitted to the transmission via the turbine shaft F1. In the foregoing case, the output torque of the engine is increased at the velocity ratio where the torque increasing effect of the stator 40 can be obtained, and this is output to the transmission.

Moreover, in a driving state other than the start of the vehicle or gear-change, if a predetermined working pressure is supplied to the hydraulic chamber 66 of the lock-up clutch 60 from the oil passage 66a provided to the turbine shaft F1 through the oil passage 66b provided between the front cover 11 and the plate member 67 fixed to the inner face thereof, the oil passage 66c provided to the piston cylinder 64 or other oil passages, the lock-up clutch 60 is locked and the front cover 11 of the case 10 and the turbine 30 will become coupled via the lock-up damper 70, and the engine output torque will be directly transmitted to the turbine 30 from the crank shaft B via the case 10, the lock-up clutch 60 and the lock-up damper 70. In the foregoing case, since the power will be transmitted to the transmission without going through the oil, the torque transmission efficiency will improve in comparison to the state when the lock-up clutch 60 is not locked, and the fuel economy of the engine will improve.

In addition, when locking the lock-up clutch 60, the oil pressure supplied to the hydraulic chamber 66 is controlled to cause the lock-up clutch 60 to be in a slipping state and subsequently causing it be fully locked in order to inhibit the shock when the lock-up clutch 60 is locked. When the plurality of friction plates 63 of the lock-up clutch 60 come in contact and the transmission of the torque is started for the first time, the shock at the time when the transmission of the torque is started is absorbed as a result of the damper spring 72 of the lock-up damper 70 being compressed, and the lock-up clutch 60 is thereby locked smoothly.

During the slip control where the lock-up clutch 60 is in a slipping state, the amount of heat generation will increase in the plurality of friction plates 63. However, with the torque converter 1, the oil supplied to the torus T can be used to cool the lock-up clutch 60 by causing it to pass through between the turbine 30, to which the lock-up clutch 60 is disposed, and the case 10; specifically, through the space 77 between the lock-up clutch 60 and the front cover 11.

The flow of the oil in the torque converter 1 is now explained.

With the torque converter 1, as described above, in addition to the oil being supplied into the torus T, separate from the flow of this oil, oil is supplied to the hydraulic chamber 66 via the oil passage 66a provided to the turbine shaft F1 as shown with the arrow A4 or other oil passages in order to control the operation of the lock-up clutch 60.

The oil that is supplied into the torus T is introduced into the torque converter 1 from the space between the stator shaft F2 and the turbine shaft F1, supplied to the space 77 where the lock-up clutch 60 is disposed through the oil passage 33a provided to the turbine hub 33 as shown with the arrow A1, supplied to the space between the pump shell 21 and the turbine shell 31 by flowing from the space 77 to the case 10 as shown with the arrow A2, and is thereby supplied to the torus T.

The oil that was supplied to the torus T passes through and circulates among the pump 20, the turbine 30 and the respective blades 22, 32, 43 of the stator 40, and a part thereof is discharged from the space between the pump sleeve 23, which is coupled to the case 10, and the stator shaft F2 as shown with the arrow A3 through the thrust bearing 55 disposed between the outer race 51 and the pump shell 21.

Figure 3:
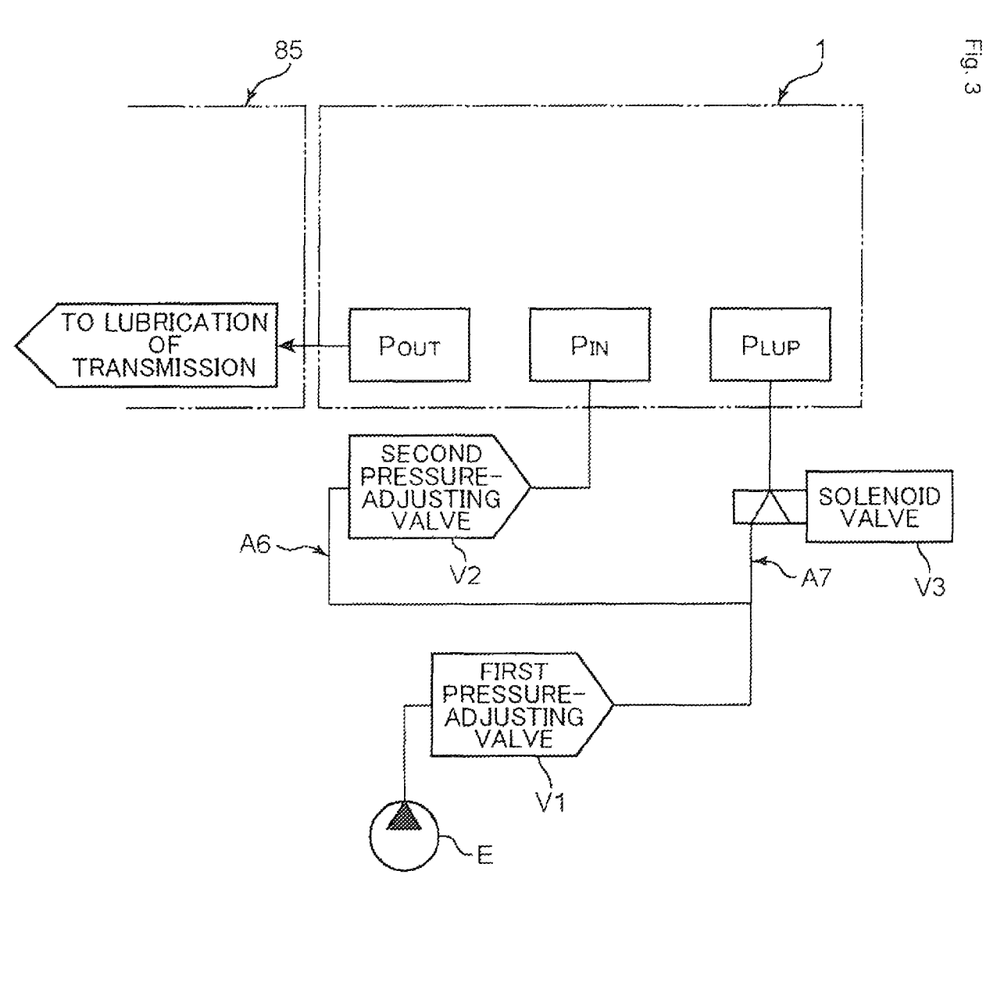
FIG. 3 is an explanatory diagram explaining the flow of the fluid to the torque converter.

Moreover, FIG. 3 is an explanatory diagram explaining the flow of the fluid to the torque converter. As shown in FIG. 3, the oil that is introduced to the torque converter 1 from the space between the stator shaft F2 and the turbine shaft F1 supplies the oil that was pumped up by the oil pump E as the fluid supply source through the oil passage A6 which connects the space between the stator shaft F2 and the turbine shaft F1 with the oil pump E, and the oil pressure is adjusted by a first pressure-adjusting valve V1 interposed on the upstream side of the oil flowing direction in the oil passage A6 and a second pressure-adjusting valve V2 interposed on the downstream side thereof, respectively.

Meanwhile, the oil introduced to the oil passage 66a for controlling the operation of the lock-up clutch 60 supplies the oil that was pumped up by the oil pump E through the oil passage A7 that branches from the space between the first pressure-adjusting valve V1 and the second pressure-adjusting valve V2 of the oil passage A6, and the oil pressure is adjusted by the solenoid valve V3 that is interposed in the oil passage A7. Note that, for example, a duty solenoid valve can be used as the solenoid valve V3.

With the torque converter 1, the oil pressure can be set to a first prescribed pressure by the first pressure-adjusting valve V1 and the oil pressure can be set to a second prescribed pressure that is lower than the first prescribed pressure by the second pressure-adjusting valve V2, and the oil pressure can be set to an arbitrary oil pressure that is lower than the first prescribed pressure by the solenoid valve V3, and the operation of the lock-up clutch 60 can thereby be controlled. Moreover, the oil discharged from the space between the pump sleeve 23 of the torque converter 1 and the stator shaft F2 is supplied for the lubrication of the transmission 85.

As described above, with the torque converter 1, formed is a fluid passage in which the oil from the oil pump E is introduced to the torque converter 1 from the space between the stator shaft F2 and the turbine shaft F1, passes through the space 77 where the lock-up clutch 60 is disposed and the torus T, and is discharged from the space between the pump sleeve 23 and the stator shaft F2, and the lock-up clutch 60 is cooled by causing the oil to pass through the space 77 where the lock-up clutch 60 is disposed.

Moreover, the torque converter 1 includes the seal member 80 at a side that is closer to the engine than the spline engagement part P2 of the inner race 52 and the stator shaft F2 which seals the space between the inner peripheral face of the inner race 52 and the outer peripheral face of the stator shaft F2. Consequently, since it is possible to inhibit the oil that was introduced from the space between the stator shaft F2 and the turbine shaft F1 from leaking to the space between the pump sleeve 23 and the stator shaft F2 through the space between the inner race 52 and the stator shaft F2, the oil can be reliably supplied to the space 77 between the turbine 30, to which the lock-up clutch 60 is disposed, and the case 10, and the cooling performance of the lock-up clutch 60 is thereby improved.

In addition, the clearance between the inner race 52 and stator shaft F2 can be increased in comparison to the case of assembling the inner race 52 and the stator shaft F2 in a tight fit as a result of providing the seal member 80 which seals the space between the inner peripheral face of the inner race 52 and the outer peripheral face of the stator shaft F2. Thus, the inner race 52 and the stator shaft F2 can be assembled relatively easily, and favorable assemblability of the torque converter 1 and the stator shaft F2 can be ensured.

Moreover, since the seal member 80 includes a lip part 82 which comes in contact with the outer peripheral face of the stator shaft F2, and the lip part 82 is provided in a direction of preventing leakage of the fluid from the engine side to the non-engine side, the eccentricity of the central axis of the inner race 52 and the central axis of the stator shaft F2 that arises upon assembling the torque converter 1 to the stator shaft F2 can be absorbed, and a favorable sealing performance can be ensured between the inner race 52 and the stator shaft F2.

In addition, since a tip part of the stator shaft F2 is provided with a guide part F2b for guiding the tip part into the seal member 80 upon assembling the torque converter 1 to the stator shaft F2, the torque converter 1 can be assembled to the stator shaft F2 relatively easily, and the assemblability of the torque converter 1 and the stator shaft F2 can be further improved.

Figure 4:
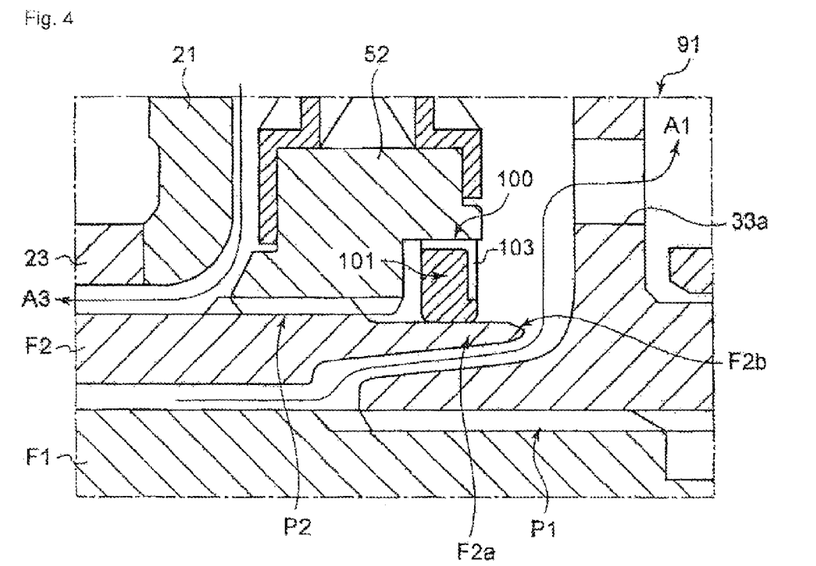
FIG. 4 is a cross sectional view showing the main part of the torque converter according to the second embodiment of the present invention.

The torque converter according to the second embodiment of the present invention is now explained. FIG. 4 is a cross section showing the main part of the torque converter according to the second embodiment of the present invention. The torque converter 91 according to the second embodiment differs from the torque converter 1 according to the first embodiment only in the shape of the seal member. Thus, the components that are configured and which function the same as those of the first embodiment are given the same reference numeral, and the explanation thereof is omitted.

As shown in FIG. 4, with the torque converter 91 according to the second embodiment also, a ring-shaped seal member 100 is mounted, via press fitting, at a side that is closer to the engine than the spline engagement part P2 of the inner race 52 and the stator shaft F2, but the seal member 100 is not provided with a lip part, and is formed from a main body part 101 having an approximately rectangular cross section.

The seal member 100 is also used for sealing the space between the inner peripheral face of the inner race 52 and the outer peripheral face of the stator shaft F2, and the main body part 101 that is disposed in the space between the inner peripheral face of the inner race 52 and the outer peripheral face of the stator shaft F2 is mounted on the inner peripheral face of the inner race 52 via press fitting. Note that the seal member 100 is also molded using an elastic material such as rubber, and a cored bar 103 is integrally formed on the main body part 101.

The torque converter 91 according to the second embodiment also includes the seal member 100 at a side that is closer to the engine than the spline engagement part P2 of the inner race 52 and the stator shaft F2, and the seal member 100 seals the space between the inner peripheral face of the inner race 52 and the outer peripheral face of the stator shaft F2. Consequently, since it is possible to inhibit the oil that was introduced from the space between the stator shaft F2 and the turbine shaft F1 from leaking to the space between the pump sleeve 23 and the stator shaft F2 through the space between the inner race 52 and the stator shaft F2, the oil can be reliably supplied to the space 77 where the lock-up clutch 60 is disposed, and the cooling performance of the lock-up clutch 60 is thereby improved.

Moreover, since the clearance between the inner race 52 and stator shaft F2 can be increased in comparison to the case of assembling the inner race 52 and the stator shaft F2 in a tight fit as a result of providing the seal member 100 which seals the space between the inner peripheral face of the inner race 52 and the outer peripheral face of the stator shaft F2, the inner race 52 and the stator shaft F2 can be assembled relatively easily, and favorable assemblability of the torque converter 91 and the stator shaft F2 can be ensured.

Figure 5:
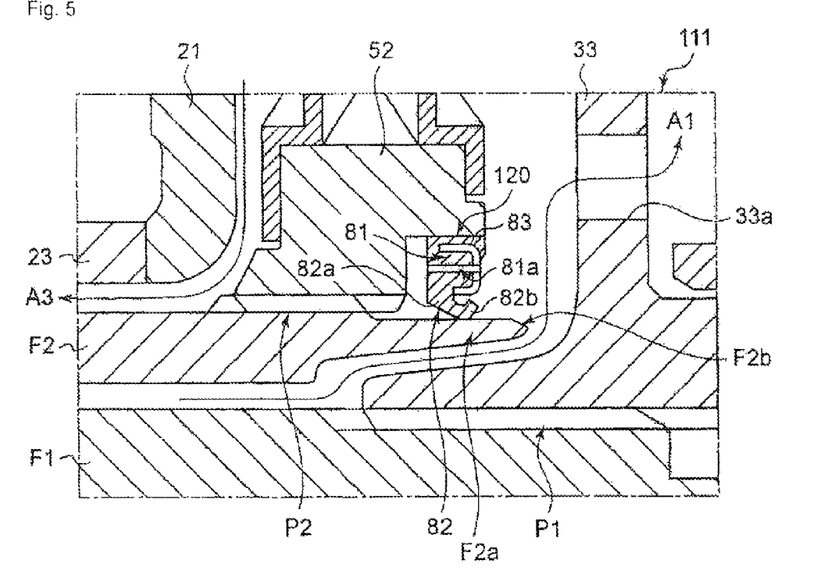
FIG. 5 is a cross sectional view showing the main part of the torque converter according to the third embodiment of the present invention.

The torque converter according to the third embodiment of the present invention is now explained. FIG. 5 is a cross section showing the main part of the torque converter according to the third embodiment of the present invention. The torque converter 111 according to the third embodiment differs from the torque converter 1 according to the first embodiment only in the shape of the seal member. Thus, the components that are configured and which function the same as those of the first embodiment are given the same reference numeral, and the explanation thereof is omitted.

As shown in FIG. 5, with the torque converter 111 according to the third embodiment also, a ring-shaped seal member 120 is mounted, via press fitting, at a side that is closer to the engine than the spline engagement part P2 of the inner race 52 and the stator shaft F2, but the seal member 120 is additionally provided with an orifice 81a which causes the engine side and non-engine side of the seal member 120 to be in communication.

The seal member 120 is also formed to have an approximately rectangular cross section, and includes a main body part 81 which comes in contact with the inner peripheral face of the inner race 52, and a lip part 82 extending from the main body part 81 toward the inner side and which comes in contact with the outer peripheral face of the stator shaft F2, but the seal member 120 is provided with an orifice 81a as a communication hole on the main body part 81 and the cored bar 83 for causing the engine side and the non-engine side of the seal member 120 to be in communication, and this orifice 81a is formed to open in the axial direction. Note that the orifice 81a is not limited to one, and a plurality of orifices 81a can also be provided in the circumferential direction of the seal member 120.

The torque converter 111 according to the third embodiment also includes the seal member 120 at a side that is closer to the engine than the spline engagement part P2 of the inner race 52 and the stator shaft F2 which seals the space between the inner peripheral face of the inner race 52 and the outer peripheral face of the stator shaft F2. Consequently, since it is possible to inhibit the oil that was introduced from the space between the stator shaft F2 and the turbine shaft F1 from leaking to the space between the pump sleeve 23 and the stator shaft F2 through the space between the inner race 52 and the stator shaft F2, the oil can be reliably supplied to the space 77 where the lock-up clutch 60 is disposed, and the cooling performance of the lock-up clutch 60 is thereby improved.

Moreover, since the clearance between the inner race 52 and stator shaft F2 can be increased in comparison to the case of assembling the inner race 52 and the stator shaft F2 in a tight fit as a result of providing the seal member 120 which seals the space between the inner peripheral face of the inner race 52 and the outer peripheral face of the stator shaft F2, the inner race 52 and the stator shaft F2 can be assembled relatively easily, and favorable assemblability of the torque converter 111 and the stator shaft F2 can be ensured.

In addition, as a result of providing, in the seal member 120, the orifice 81a for causing the engine side and the non-engine side of the seal member 120 to be in communication, oil can be caused to slightly flow from the engine side to the non-engine side of the seal member 120. Thus, it is possible to inhibit the oil or foreign matter from remaining on the engine side of the seal member 120 while reliably supplying oil to the space 77 where the lock-up clutch 60 is disposed.

As evident from the foregoing explanation, with the torque converters 1, 91, 111 according to the present embodiments, as a result of the seal members 80, 100, 120 which seal the space between the inner peripheral face of the inner race 52 and the outer peripheral face of the stator shaft F2 being provided at a side that is closer to the engine than the spline engagement part P2 of the inner race 52 and the stator shaft F2, the cooling performance of the lock-up clutch 60 can be improved while ensuring the favorable assemblability of the torque converters 1, 91, 111 and the stator shaft F2.

Finally, the configuration and effects of the foregoing embodiments are explained.

The torque converter of the foregoing first to third embodiments includes a case coupled to an output shaft of an engine, a pump which rotates integrally with the case, a turbine disposed opposite to an engine side of the pump, a stator which is disposed on the inside of a part between the pump and the turbine that are opposite to each other and which has a one-way clutch on the inside thereof, a torus formed by the pump, the turbine and the stator within the case, a lock-up clutch which is disposed at a side that is closer to the engine than the turbine and which directly couples the turbine and the case, a turbine shaft coupled to the turbine and extending toward a transmission, a stator shaft which is disposed on the outside of the turbine shaft and which extends from a transmission case of an automatic transmission and which is spline-engaged with an inner race of the one-way clutch, a pump sleeve disposed on the outside of the stator shaft and extending from the case toward the transmission to drive an oil pump, a fluid passage formed so that a fluid from the oil pump is introduced from a space between the stator shaft and the turbine shaft, and discharged from a space between the pump sleeve and the stator shaft through a space which is located between the turbine and the case and in which the lock-up clutch is disposed, and through the torus, and a seal member which is disposed at a side that is closer to the engine than a spline engagement part of the inner race and the stator shaft, and seals a space between an inner peripheral face of the inner race and an outer peripheral face of the stator shaft.

Specifically, with the foregoing configuration, the torque converter including a fluid passage formed so that a fluid from the oil pump is introduced from the space between the stator shaft and the turbine shaft, and discharged from the space between the pump sleeve and the stator shaft through a space which is located between the turbine and the case and in which the lock-up clutch is disposed, and through the torus, further includes a seal member disposed at a side that is closer to the engine than a spline engagement part of the inner race and the stator shaft, and which seals the space between an inner peripheral face of the inner race and an outer peripheral face of the stator shaft.

Consequently, since the clearance between the inner race and stator shaft can be increased in comparison to the case of assembling the inner race and the stator shaft in a tight fit, the inner race and the stator shaft can be assembled relatively easily, and favorable assemblability of the torque converter and the stator shaft can be ensured. Moreover, since it is possible to inhibit the fluid introduced from the space between the stator shaft and the turbine shaft from leaking to the space between the pump sleeve and the stator shaft through the space between the inner race and the stator shaft, the fluid can be reliably supplied to the space which is located between the turbine and the case and in which the lock-up clutch is disposed, and the cooling performance of the lock-up clutch can be improved. Accordingly, the cooling performance of the lock-up clutch can be improved while maintaining the favorable assemblability of the torque converter and the stator shaft.

Moreover, with the torque converter of the foregoing first to third embodiments, the seal member is disposed so as to overlap with the one-way clutch in an axial direction.

According to the foregoing configuration, as a result of the seal member being disposed so as to overlap with the one-way clutch in the axial direction, the axial direction dimension of the torque converter can be shortened in comparison to the case where the seal member and the one-way clutch do not overlap with each other in the axial direction, and the torque converter can be configured to be compact in the axial direction.

In addition, with the torque converter of the foregoing first and third embodiments, the seal member includes a lip part which comes in contact with the outer peripheral face of the stator shaft, and the lip part is provided in a direction of preventing leakage of the fluid from the engine side to a non-engine side.

According to the foregoing configuration, the seal member includes a lip part which comes in contact with the outer peripheral face of the stator shaft. Since the lip part is provided in a direction of preventing omission of the fluid from the engine side to the non-engine side, the eccentricity of the central axis of the inner race and the central axis of the stator shaft that arises upon assembling the torque converter to the stator shaft can be absorbed. Thus, a favorable sealing performance can be ensured between the inner race and the stator shaft, and the foregoing effect can be obtained more effectively.

Further still, with the torque converter of the foregoing first to third embodiments, a tip part of the stator shaft is provided with a guide part for guiding the tip part into the seal member upon assembling the torque converter to the stator shaft.

According to the foregoing configuration, a tip part of the stator shaft is provided with a guide part for guiding the tip part into the seal member upon assembling the torque converter to the stator shaft. Thus, the torque converter can be assembled to the stator shaft relatively easily, and the assemblability of the torque converter and the stator shaft can be further improved.

Furthermore, with the torque converter of the foregoing third embodiment, the seal member is provided with an orifice which causes the engine side and a non-engine side of the seal member to be in communication.

According to the foregoing configuration, the seal member is provided with an orifice which causes the engine side and the non-engine side of the seal member to be in communication. Thus, since oil can be caused to slightly flow from the engine side to the non-engine side of the seal member, it is possible to inhibit the oil or foreign matter from remaining on the engine side of the seal member while reliably supplying oil to the space where the lock-up clutch is disposed.

As described above, the first to third embodiments were illustrated as examples of the torque converter of the present invention, but the present invention is not limited to the illustrated embodiments, and it goes without saying that the present invention can be subject to various improvements and design changes to the extent that it does not deviate from the gist hereof.

INDUSTRIAL APPLICABILITY

As described above, according to the present invention, a torque converter capable of improving the cooling performance of the lock-up clutch while ensuring favorable assemblability of the torque converter and the stator shaft is realized. Thus, the present invention can be suitably used in the technical field of manufacturing this type of torque converter or automatic transmission, or vehicles mounting the same.

The invention claimed is:

1. A torque converter, comprising:
   a case coupled to an output shaft of an engine;
   a pump which rotates integrally with the case;
   a turbine disposed opposite to an engine side of the pump;
   a stator which is disposed on the inside of a part between the pump and the turbine that are opposite to each other and which has a one-way clutch on the inside thereof;
   a torus formed by the pump, the turbine and the stator within the case;

a lock-up clutch which is disposed at a side that is closer to the engine than the turbine, and directly couples the turbine and the case;

a turbine shaft coupled to the turbine and extending toward a transmission;

a stator shaft disposed on the outside of the turbine shaft, extending from a transmission case of an automatic transmission and spline-engaged with an inner race of the one-way clutch;

a pump sleeve disposed on the outside of the stator shaft and extending from the case toward the transmission to drive an oil pump;

a fluid passage formed so that a fluid introduced from a space between the stator shaft and the turbine shaft by the oil pump is supplied to a space which is located between the turbine and the case and in which the lock-up clutch is disposed, through a space on a side closer to the engine than a spline engagement part of the inner race and the stator shaft, and then discharged from a space between the pump sleeve and the stator shaft through the torus; and a seal member which is disposed at a side that is closer to the engine than the spline engagement part of the inner race and the stator shaft, and seals a space between an inner peripheral face of the inner race and an outer peripheral face of the stator shaft for inhibiting the fluid that was introduced from the space between the stator shaft and the turbine shaft from leaking through the spline engagement part of the inner race and the stator shaft before being supplied to the space which is located between the turbine and the case and in which the lock-up clutch is disposed, the seal member including a lip part which comes in contact with the outer peripheral face of the stator shaft, and the lip part being provided in a direction of preventing leakage of the fluid from the engine side to a non-engine side.

2. The torque converter according to claim 1, wherein the seal member is disposed so as to overlap with the one-way clutch in an axial direction.

3. The torque converter according to claim 1, wherein the lip part is provided so that it comes in contact with the outer peripheral face of the stator shaft in a state of being inclined to be positioned on a side closer to the engine as it approaches the outer peripheral face of the stator shaft.

4. A torque converter, comprising:
a case coupled to an output shaft of an engine;
a pump which rotates integrally with the case;
a turbine disposed opposite to an engine side of the pump;
a stator which is disposed on the inside of a part between the pump and the turbine that are opposite to each other and which has a one-way clutch on the inside thereof;
a torus formed by the pump, the turbine and the stator within the case;
a lock-up clutch which is disposed at a side that is closer to the engine than the turbine, and directly couples the turbine and the case;
a turbine shaft coupled to the turbine and extending toward a transmission;
a stator shaft disposed on the outside of the turbine shaft, extending from a transmission case of an automatic transmission and spline-engaged with an inner race of the one-way clutch;
a pump sleeve disposed on the outside of the stator shaft and extending from the case toward the transmission to drive an oil pump;

a fluid passage formed so that a fluid introduced from a space between the stator shaft and the turbine shaft by the oil pump is supplied to a space which is located between the turbine and the case and in which the lock-up clutch is disposed, through a space on a side closer to the engine than a spline engagement part of the inner race and the stator shaft, and then discharged from a space between the pump sleeve and the stator shaft through the torus; and a seal member which is disposed at a side that is closer to the engine than the spline engagement part of the inner race and the stator shaft, and seals a space between an inner peripheral face of the inner race and an outer peripheral face of the stator shaft for inhibiting the fluid that was introduced from the space between the stator shaft and the turbine shaft from leaking through the spline engagement part of the inner race and the stator shaft before being supplied to the space which is located between the turbine and the case and in which the lock-up clutch is disposed, a tip part of the stator shaft being provided with a guide part for guiding the tip part into the seal member upon assembling the torque converter to the stator shaft.

5. The torque converter according to claim 4, wherein the seal member is disposed so as to overlap with the one-way clutch in an axial direction.

6. A torque converter, comprising:
a case coupled to an output shaft of an engine;
a pump which rotates integrally with the case;
a turbine disposed opposite to an engine side of the pump;
a stator which is disposed on the inside of a part between the pump and the turbine that are opposite to each other and which has a one-way clutch on the inside thereof;
a torus formed by the pump, the turbine and the stator within the case;
a lock-up clutch which is disposed at a side that is closer to the engine than the turbine, and directly couples the turbine and the case;
a turbine shaft coupled to the turbine and extending toward a transmission;
a stator shaft disposed on the outside of the turbine shaft, extending from a transmission case of an automatic transmission and spline-engaged with an inner race of the one-way clutch;
a pump sleeve disposed on the outside of the stator shaft and extending from the case toward the transmission to drive an oil pump;
a fluid passage formed so that a fluid introduced from a space between the stator shaft and the turbine shaft by the oil pump is supplied to a space which is located between the turbine and the case and in which the lock-up clutch is disposed, through a space on a side closer to the engine than a spline engagement part of the inner race and the stator shaft, and then discharged from a space between the pump sleeve and the stator shaft through the torus; and
a seal member which is disposed at a side that is closer to the engine than the spline engagement part of the inner race and the stator shaft, and seals a space between an inner peripheral face of the inner race and an outer peripheral face of the stator shaft for inhibiting the fluid that was introduced from the space between the stator shaft and the turbine shaft from leaking through the spline engagement part of the inner race and the stator shaft before being supplied to the space which is located between the turbine and the case and in which the lock-up clutch is disposed.

* * * * *